United States Patent [19]

Watanabe et al.

[11] 4,229,683
[45] Oct. 21, 1980

[54] DEVICE FOR CONTROLLING THE MOVEMENT OF A MOVABLE MEMBER

[75] Inventors: Kikuo Watanabe; Mitsutaka Kazino; Hisashi Yamazaki, all of Nagoya, Japan

[73] Assignee: Brother Kogyo Kabushiki Kaisha, Aichi, Japan

[21] Appl. No.: 26,551

[22] Filed: Apr. 2, 1979

[30] Foreign Application Priority Data

Apr. 14, 1978 [JP] Japan .................. 53/44640

[51] Int. Cl.³ .............................. G05G 5/00
[52] U.S. Cl. .................................. 318/466; 318/468; 318/282; 318/626
[58] Field of Search ............... 318/466, 468, 257, 266, 318/267, 282, 626

[56] References Cited

U.S. PATENT DOCUMENTS

| 2,756,133 | 7/1956 | Butzin | 318/468 X |
| 3,187,247 | 6/1965 | Colten et al. | 318/257 |
| 3,648,140 | 3/1972 | Majek | 318/282 |
| 3,714,537 | 1/1973 | Bur | 318/466 X |
| 3,857,079 | 12/1974 | Wake et al. | 318/626 X |

Primary Examiner—B. Dobeck
Attorney, Agent, or Firm—Browdy and Neimark

[57] ABSTRACT

A movement controlling device for the movement of a movable member such as a table in a machine tool which is capable of doing a rapid feeding, a normal feeding for cutting, and a rapid returning. The movable member is driven by a fluid pressure cylinder and engaged, at a predetermined position in the forward movement stroke, with a rack which is linked to a motor by way of the gearing mechanism including a worm and a worm-wheel. The motor is so driven, due to a signal from a sensor for sensing the engagement between the rack and the movable member, as to shift the rack at the speed of cutting feed in the same direction as that of the forward movement of the movable member, and the movable member which is driven by the fluid pressure cylinder is also shifted in response to the shift of the rack. The movable member is, activated by the action of the fluid pressure cylinder due to a signal from a means for sensing the end position of the forward movement of the movable member, returned to the original position at a rapid speed. The rack is to be returned to a predetermined position, independently from the movement of the movable member, at a higher speed than the cutting feed speed due to the reverse rotation of the motor.

5 Claims, 10 Drawing Figures

DEVICE FOR CONTROLLING THE MOVEMENT OF A MOVABLE MEMBER

BACKGROUND OF THE INVENTION

This invention relates to a device for controlling the movement of a movable member such as a table in a machine tool, which is driven by a fluid pressure means, more particularly, to an improvement of a movement controlling device wherein a movable member, which is under control of a fluid pressure means, is made, from a predetermined position of its forward movement stroke, to follow the shifting speed of a member shifted at a cutting feed speed by another driving means such as a motor.

In this kind of device the motor may be of small power, since the movable member is driven by the fluid pressure means and the motor only functions to move a controlling member, such as a rack, for the movable member. And the moving speed of the movable member can also be controlled at a predetermined speed, even when a force be applied in the course of working on the movable member in the forward direction, by means of so controlling the device as to prevent the motor from a rotation due to a force from the rack side, for example, by installing a worm and a worm wheel in an intermediate mechanism between the rack and the motor. Such a device is therefore very much preferable as a controlling device for the movement of a table in a milling machine, especially as one for doing a down cut operation.

As a device having the above purpose, one with the following structure is already known, wherein a rack connected to a one-way-rotatable motor via a one-way clutch is so disposed as to be able to engage with, at a predetermined position in the forward movement stroke of the movable member, the movable member for controlling the moving speed thereof by the movement of the rack regulated by the rotation speed of the motor, and to be able to return to a predetermined position in accordance with the returning movement of the movable member.

In a device of such structure, inherent defects of the clutch itself are liable to appear unrectified, such as an instability of engagement timing, a quick wearing, etc. If and when the engagement (linking) in the one-way clutch is not completed instantaneously, the movable member is liable to be shifted at a high speed for some more time even after the engagement of the movable member and the rack. When the one-way clutch should fail to engage wholely, the movable member would continue to be shifted at the high speed. It can cause the tools for machining a work on the movable member such as drills or cutters to be damaged, furthermore, cause the movable member itself to run desperately, with the result of wrecking the frame or fluid pressure means.

Another proposition, wherein a rack is directly secured to the movable member and the rack is connected to a motor via a gearing mechanism, is also being known. In this case a motor of extremely large power is required, because the motor must directly drive the movable member.

SUMMARY OF THE INVENTION

It is therefore a primary object of this invention to provide a movement controlling device for a movable member, taking the above-mentioned background into consideration, capable of moving the movable member without fail at a cutting feed speed, from a predetermined position in the forward movement stroke of the movable member.

Preferred embodiments in accordance with this invention are provided with (a) fluid pressure means for reciprocating the movable member; (b) a rack which is capable of moving together with the movable member, upon engaging therewith, at a predetermined position in the forward movement stroke thereof; (c) a motor which is reversible and linked with a pinion, which is engaged with the rack by way of a worm and a worm wheel etc.; (d) a first sensing means for sensing the engagement of the movable member with the rack; (e) a first driving circuit for driving the motor forwardly (positively) in response to a signal from the first sensing means; (f) a second sensing means for sensing the arrival of the movable member at the end position thereof in the forward movement stroke; (g) a second driving circuit for driving the motor backwardly (reversely) in response to a signal from the second sensing means; and (h) means for changing the operating direction of the fluid pressure means in response to the signal from the second sensing means. The movable member is to follow the movement of the rack, which is regulated without fail by the rotaional movement of the motor, after it has been engaged with the rack. And the rack is, when the movable member is retracted or backwardly moved, returned as far as a predetermined position, without any linkage with the movable member, i.e., independently.

Another object of this invention is to provide a movement controlling device having a novel sensing means for sensing the arrival of the movable member at the cutting feed initiating position.

A still another object of this invention is to provide a novel movement controlling device which is capable of altering the cutting feed initiating position extremely easily.

BRIEF DESCRIPTION OF THE DRAWINGS

Figures are for illustrating embodiments of this invention applied to a milling machine, in which.

DETAILED DESCRIPTION OF THE PREFERRED EMBODIMENTS

Numeral 2 designates a movable member slidably disposed on a machine frame 1, that is, a table; 3 designates a fluid cylinder as a fluid pressure means, which is connected via a valve 4 to a pump 5; and 6 does a piston rod of the fluid cylinder 3, whose one and 6a is fixed to the table 2.

Numeral 7 designates a rack slidably disposed on the frame 1, whose one end is confronted to a tip of the piston rod 6; 25 designates an anti-swelling (anti-rising) member secured to the frame 1 for preventing a swell (or floating up) of the rack 7, which is in engagement with a pinion 8. A pinion shaft 9 connects the pinion 8 to a worm wheel 10 which is in engagement with a worm 11 formed on a rotary shaft 12. Therefore, the driving force given from the worm wheel side cannot affect or rotate the rotary shaft 12.

Numeral 13 designates a variable speed motor which is rotatable in either forward and backward direction. It is provided with a motor shaft 14; and 15 is a small gear secured to the motor shaft 14 and engaged with a large gear 16 secured on the rotary shaft 12.

An actuating rod 17 is movably mounted on, in the same direction with, the rack 7. One end of the actuating rod 17 is positioned in confrontation with the piston rod 6 and is slightly projecting beyond the end of the rack 7 by the action of a compression spring 18 disposed on one end of the rack 7 where the latter is engaged with the piston rod 6.

Figure 1:
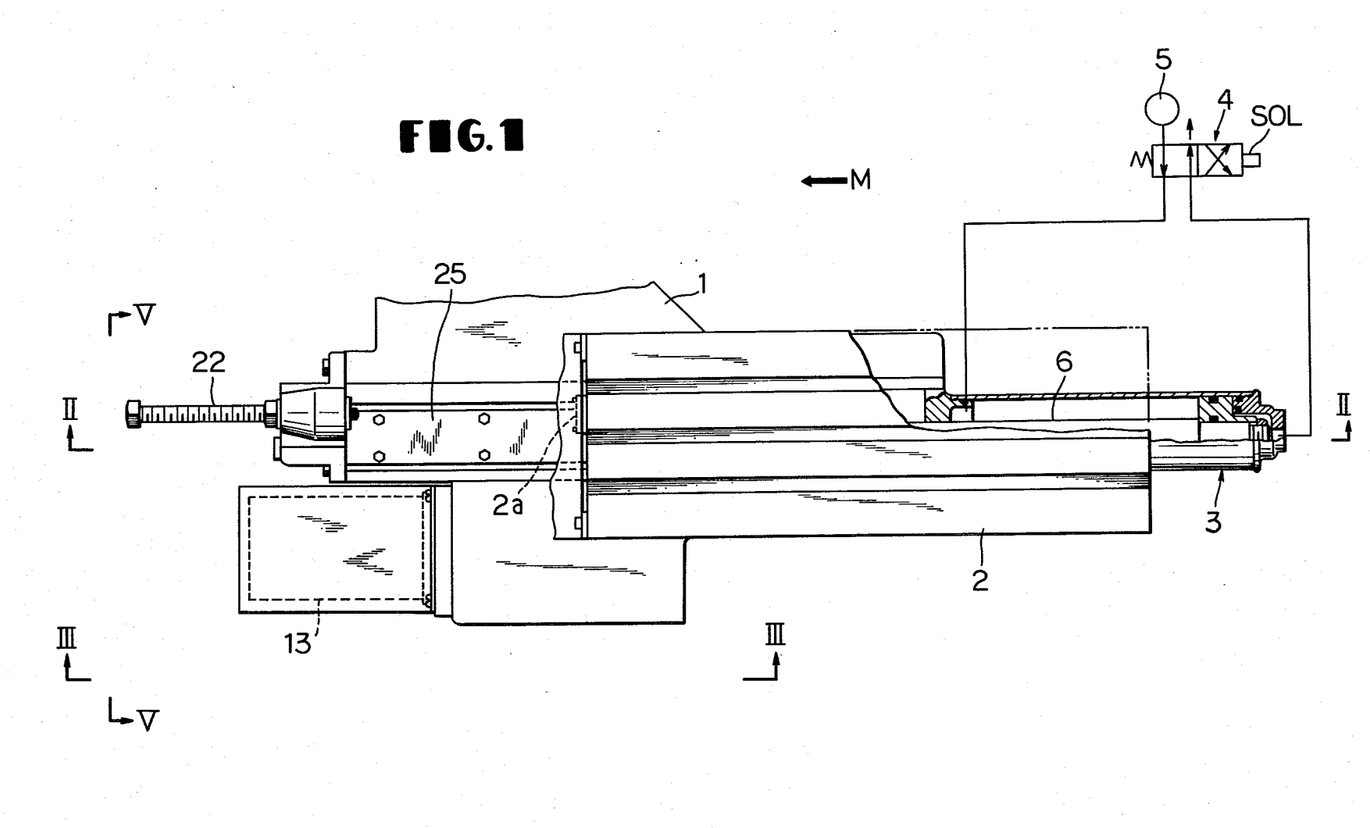
FIG. 1 is a plan view of an essential part of an embodiment shown in a cross-section.
Figure 2:
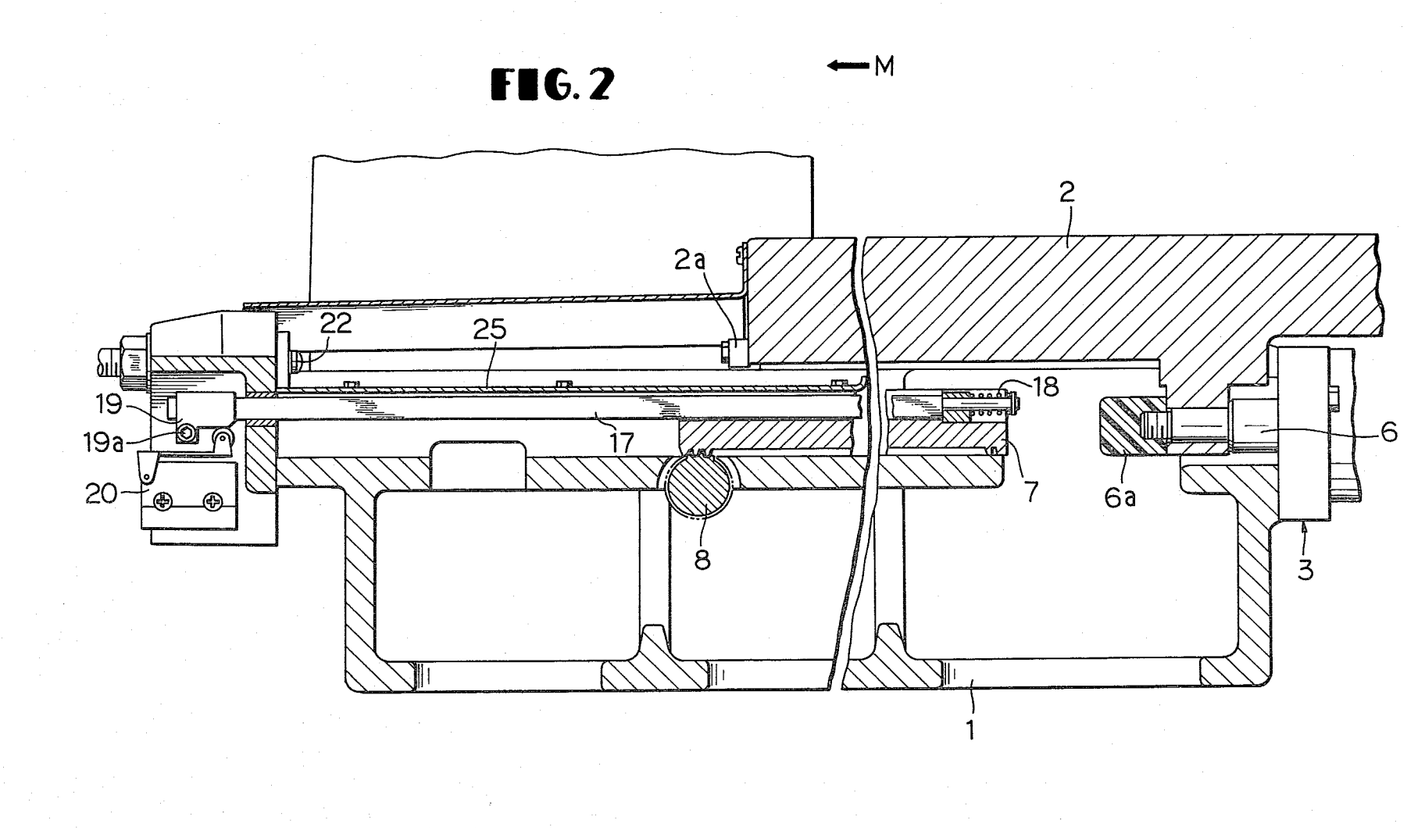
FIG. 2 is a cross sectional view taking along the sectional line II—II of FIG. 1.

A switch actuating member 19 is attached to, position-adjustably in the moving direction of, the other end portion of the actuating rod 17. Numeral 20 designates a first switch fixed to the frame 1, which is to be operated by the switch actuating member 19 when the piston rod 6 abuts the actuating rod 17 to slightly move the latter in the direction of an arrow M (see FIGS. 1 and 2).

Figures 3, 6:
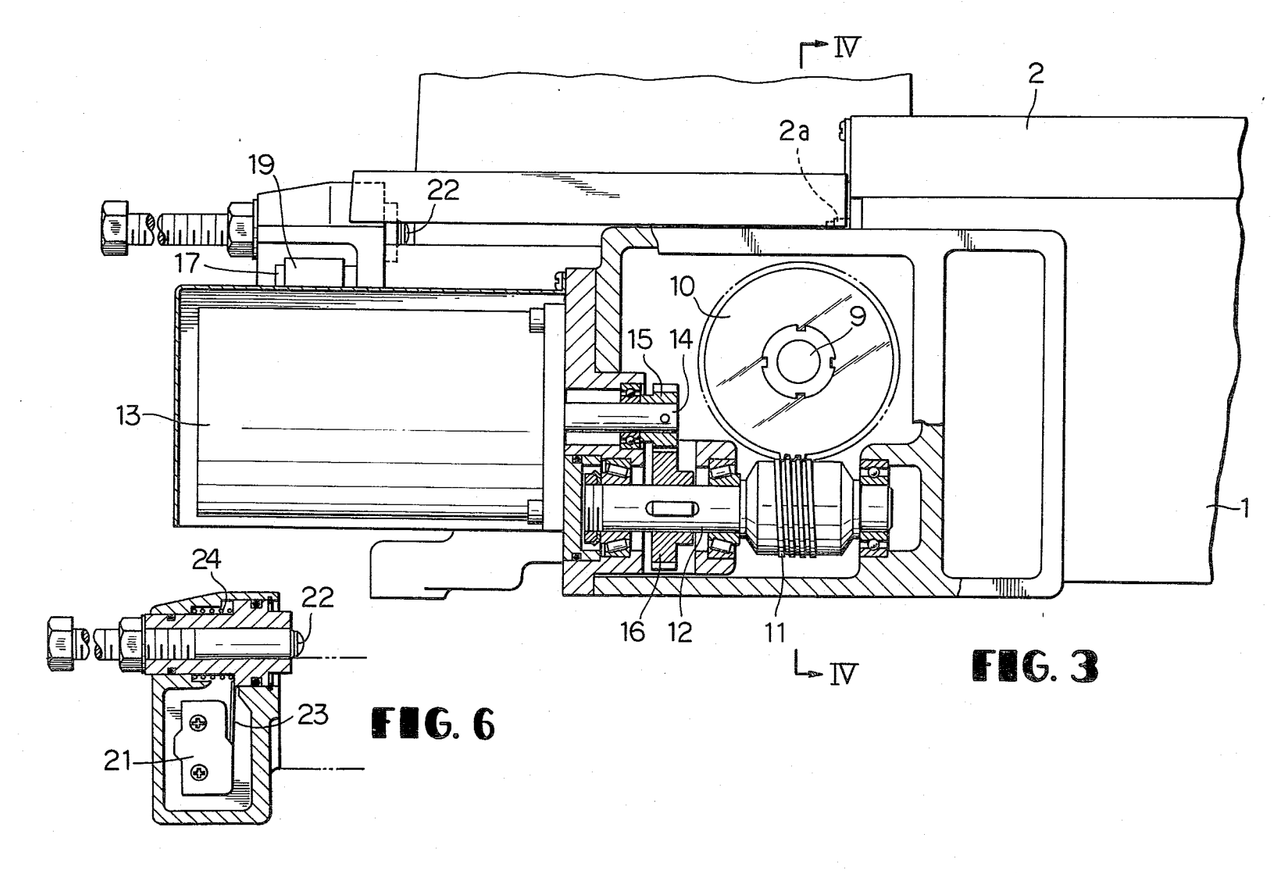
FIG. 3 is a projectional view of the embodiment in FIG. 1 seen from the direction of the arrow marked with III.
FIG. 6 is an explanatory view of a second switch 21 for explaining the operation mode thereof.
Figure 4:
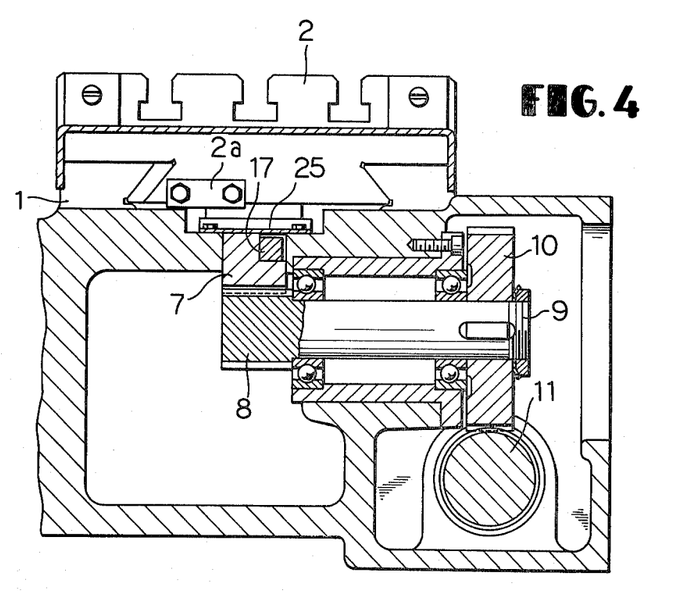
FIG. 4 is a cross sectional view taken along the sectional line IV—IV of FIG. 3.
Figure 5:
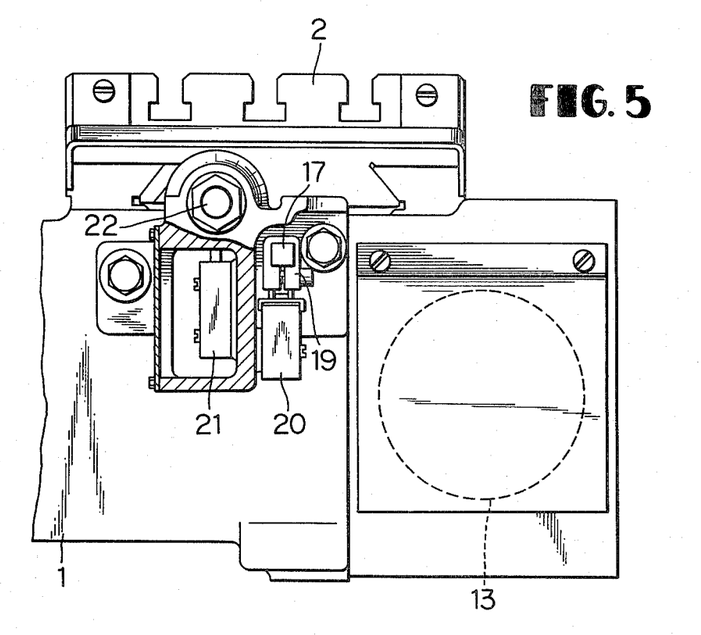
FIG. 5 is a projectional view of the embodiment in FIG. 1 seen from the direction of the arrow marked with V.

Numeral 21 (in FIGS. 5 and 6) designates a second switch for sensing the end position of the forward movement of the table 2 and provided with an actuating lever 23; 22 is another switch actuating member movably attached to the frame 1, which actuating member is constantly biased in the counter arrow M direction by a spring 24. When the table 2 is moved up to the end position of its movement a dog 2a attached to the front end of the table 2 collides with the switch actuating member 22 to slightly move the latter in the direction of the arrow M for in turn actuating the second switch 21. A position adjusting of the end of the switch actuating member 22 allows the alteration of the end position of the table's forward movement.

Figures 7, 9:
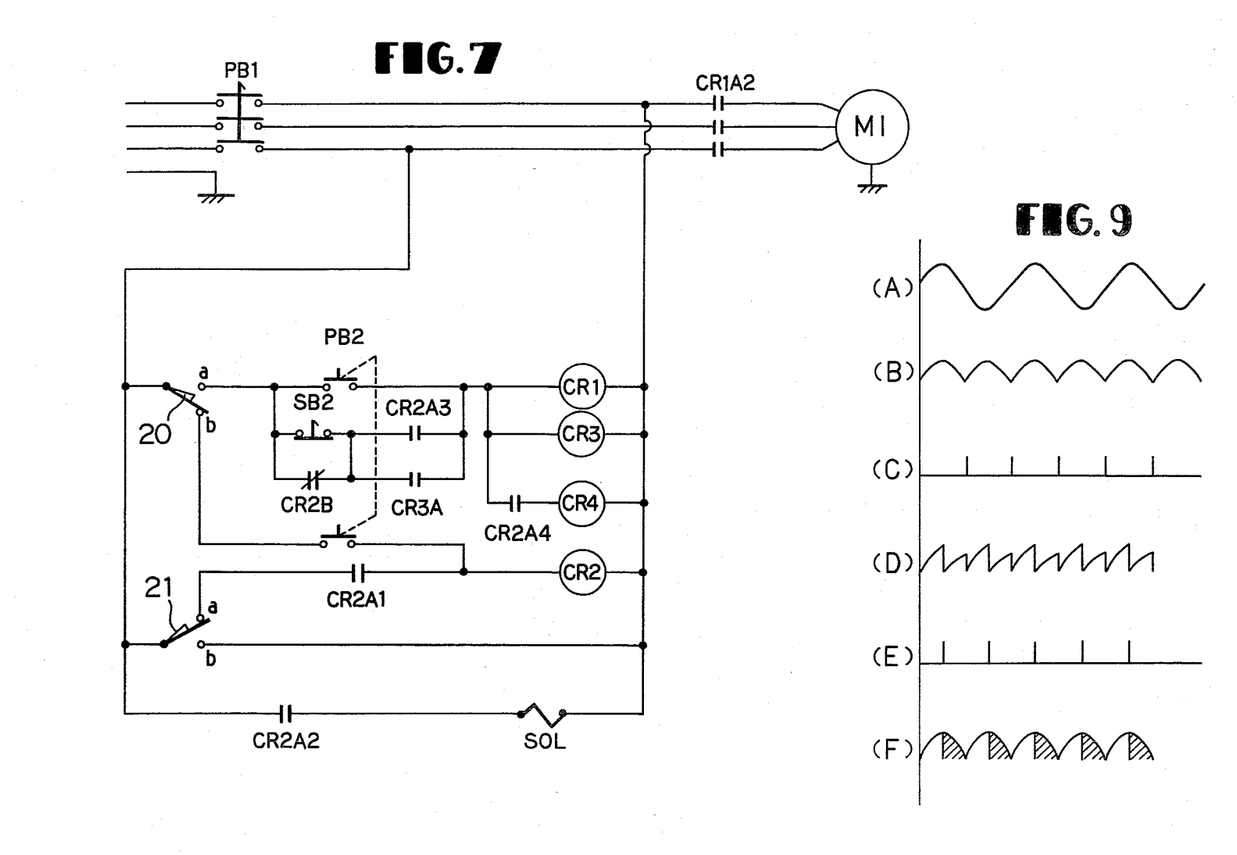
FIG. 7 is an electric circuit for controlling the operation of the device.
FIG. 9 is a diagram of output wave forms.
Figure 8:
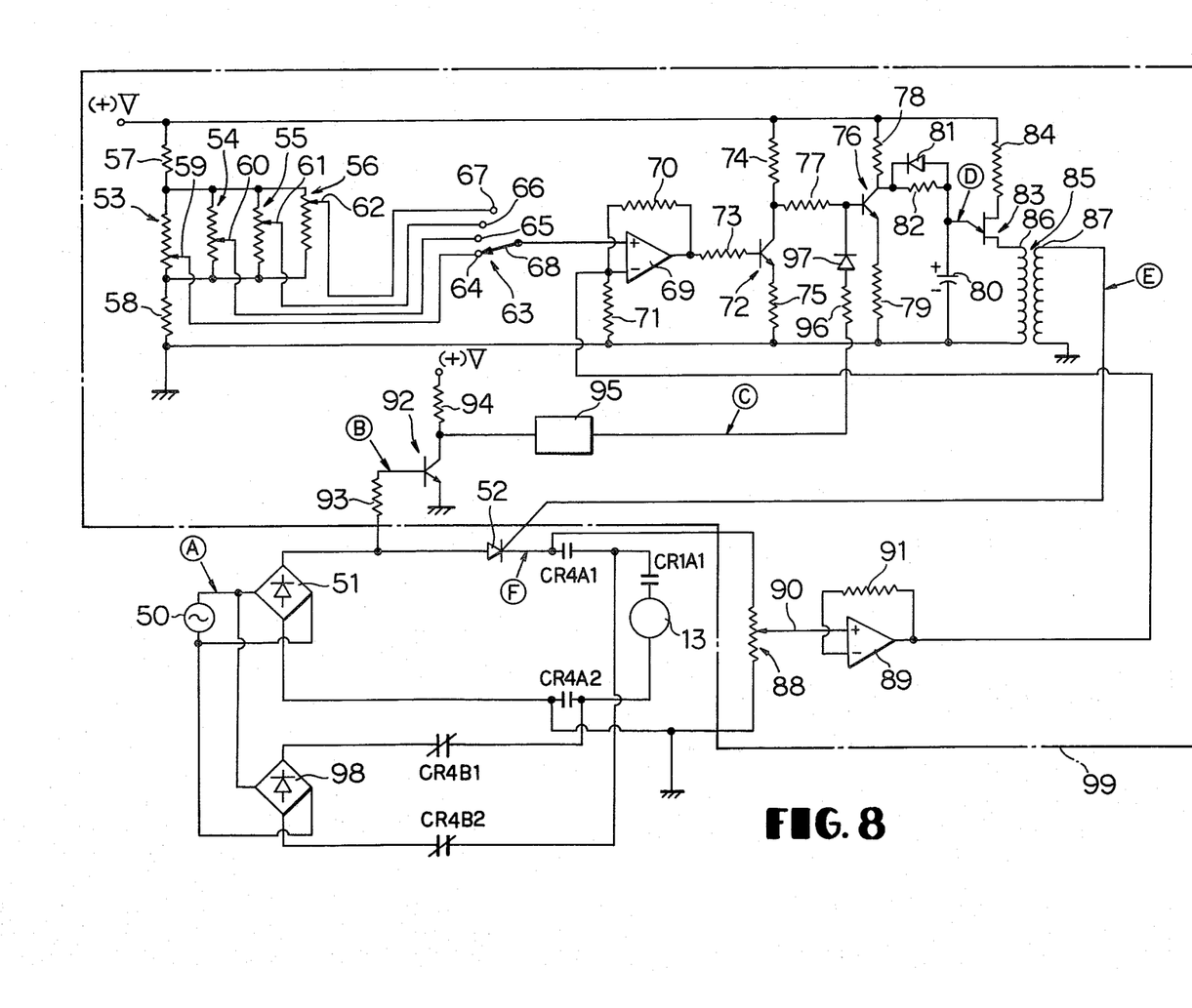
FIG. 8 is a diagram of a controlling circuit for controlling a motor 13.

Referring to FIGS. 7 and 8, an electric circuit and a motor controlling circuit of the embodiment will be described hereunder. In the drawings M1 (see FIG. 7) designates a motor for driving a milling machine (not shown), PB1 a power source switch, PB2 a starting switch, SB2 an adjusting switch, CR1 a relay having normal open contacts $CR1A_1$ and $CR1A_2$, CR2 a relay having normal open contacts $CR2A_1$ to $CR2A_4$, CR3 a relay having a normal open contact CR3A, CR4 a relay having normal open contacts $CR4A_1$ and $CR4A_2$ as well as normal close contacts $CR4B_1$ and $CR4B_2$, and SOL designates a solenoid for switching over the valve 4.

In FIG. 8, an alternating source 50 is with its both terminals connected to input terminals of a full wave rectifier 51.

Numeral 52 designates a silicon rectifying element, whose anode is connected to the positive output terminal of the full wave rectifier 51, whose cathode is connected to the negative output terminal of the full wave rectifier 51, via the normal open contact $CR4A_1$ of the relay CR4, the normal open contact $CR1A_1$ of the relay CR1, the motor 13, and the normal open contact $CR4A_2$ of the relay CR4, and whose gate is connected to a secondary coil 87 of a transformer 85.

Numeral 99 designates a speed setting circuit for the motor 13, composed of under-mentioned elements. 53–56 are potentiometers, which are connected in parallel to each other, and each of whose one terminal is connected via a resistor 57 to a (+)V, while each of the other terminal of them is earthed via a resistor 58. Sliding terminals 59–62 of the potentiometers 53–56 are respectively connected to a fixed terminal 64–67 of a change-over switch 63. A movable terminal 68 of the change-over switch 63 is connected to a positive input terminal of a first operational amplifier 69. 70 designates a resistor, whose one end is connected to the output side of the first operational amplifier 69 and the other end is connected to the negative input terminal of the same amplifier 69 and at the same time earthed via a resistor 71. 72 indicates a transistor, whose base is connected via a resistor 73 to the output terminal of the first operational amplifier 69, whose collector is connected via a resistor 74 to a (+)V, and whose emitter is earthed via a resistor 75; 76 indicates a transistor, whose base is connected via a resistor 77 to the collector of the transistor 72, and whose collector is connected via a resistor 78 to the (+)V, and whose emitter is via a resistor 79 earthed. 80 is a capacitor, whose one terminal on the (+) side is connected to the collector of the transistor 76 via a parallel circuit of a diode 81 and a resistor 82, and the other terminal on the (−) side is earthed. 83 is a uni-junction transistor, whose emitter is connected to the terminal on the (+) side of the capacitor 80, whose first base is earthed via the primary coil 86 of the transformer 85 and the second base is connected via a resistor 84 to the (+)V. One end of the secondary coil 87 of the transformer 85 is connected as earlier stated to the gate of the silicon rectifying element 52, and the other end is earthed. 88 designates a potentiometer, whose one end is connected to the cathode of the silicon rectifying element 52 and the other end is connected to the negative output terminal of the full wave rectifier 51 and at the same time is earthed. 89 is a second operational amplifier, whose input terminal on the (+) side is connected to the sliding terminal 90 of the potentiometer 88. 91 is a resistor, whose one end is connected to the input terminal on the (−) side of the operational amplifier 89 and the other end to the output terminal of the operational amplifier 89. The output terminal of the operational amplifier 89 is connected to the input terminal on the (−) side of the first operational amplifier 69. 92 is a transistor, whose base is connected via a resistor 93 to the positive output terminal of the full wave rectifier 51, whose collector is connected via a resistor 94 to the (+)V, and whose emitter is earthed. 95 is a Schmidt trigger circuit, whose one end is connected to the collector of the transistor 92 and the other end to the base of the transistor 76 by way of a resistor 96 and a diode 97.

98 also designates in the drawing a full wave rectifier, whose two input terminals are connected to the alternating source 50, whose positive output terminal is connected, via the normal close contact CR4B$_1$ of the relay CR4, to a junction of the normal open contact CR4A$_2$ and the motor 13, and whose negative output terminal is connected via the normal close contact CR4B$_2$ of the relay CR4 to a junction of the normal open contact CR1A$_1$ and the normal open contact CR4A$_1$.

As can clearly be understood from the above-mentioned structure, a first driving circuit is constituted of the full wave rectifier 51, the silicon rectifying element 52, the normal open contacts CR4A$_1$ and CR1A$_1$, the motor 13, and the normal open contact CR4A$_2$, and a second driving circuit is constituted of the full wave rectifier 98, the normal close contact CR4B$_1$, the motor 13, the normal open contact CR1A$_1$, and the normal close contact CR4B$_2$.

The operational mode of this embodiment, having the above described structure, will be deployed hereunder.

FIGS. 1 through 5 indicate the table 2 and the rack 7 which are returned to the original position. A switch actuating finger of the first switch 20 is depressed by the switch actuating member 19 to be in a position wherein it has selected a b-contact.

The movable terminal 68 of the change-over switch 63 in FIG. 8 is connected to the fixed terminal 64, for driving the motor 13, in this status, at the lowest speed. When the power source switch PB1 is depressed in this condition, followed by depressing of the starting switch PB2, the relay CR2 is energized, via the b-contact of the first switch 20 and the starting switch PR2, to close the normal open contact CR2A$_1$ through CR2A$_4$, and consequently the relay CR2 is to be self-retained by virtue of the a-contact of the second switch 21 and the normal open contact CR2A$_1$ of the relay CR2.

As the solenoid SOL is then energized to switch over the valve 4, the table 2 is to be shifted at a rapid feeding speed in the direction of the arrow M as far as the tip of the piston rod 6 abuts the rack 7. When the tip of the piston rod 6 abuts on the actuating rod 17 the same is shifted resisting the action of the spring 18, which separates the switch actuating member 19 from the switch actuating finger of the first switch 20, resulting the latter to be shifted from the b-contact to the a-contact.

The relays CR1 and CR3 are in turn energized by way of the a-contact of the first switch 20, the switch SB2, and the normal open contact CR2A$_3$; and the relay CR4 is similarly energized by way of the a-contact of the first switch 20, the switch SB2, and the normal open contacts CRA$_3$ and CRA$_4$ to close each of the normal open contacts of the respective relay CR1, CR3, and CR4.

The motor M1 is to be driven by virtue of the closing of the normal open contact CR1A$_2$.

And the motor 13 is, in response to the closing of the normal open contacts CR4A$_1$, CR1A$_1$, and CR4A$_2$, driven in the positive direction. The rotational force (torque) of the motor 13 is transmitted, by way of the motor shaft 14, the small gear 15, the large gear 16, the rotary shaft 12, the worm 11, the worm wheel 10, the pinion shaft 9, and the pinion 8, to the rack 7, which is started to move at a low speed (cutting feed speed) in the direction of the arrow M. Following the movement of the rack 7 the table 2 is shifted by the action of the fluid cylinder 3.

The table 2 is therefore shifted at the cutting feed speed which is regulated by the moving speed of the rack 7, which rack is again moved in response to the rotation of the motor 13; and a work fixed on the table 2 is to be machined by a cutting tool of the milling machine. The rotating speed of the motor 13 is controlled in this situation as described hereunder.

On the positive input terminal of the first operational amplifier 69 is input a voltage which has been set at the potensiometer 53. The input voltage to this operational amplifier 69 is to be, after having been amplified at the operational amplifier 69 and the transistor 72, input to the base of the transistor 76. The resistance value between the collector and the emitter of the transistor 76 is therefore proportionate to the voltage value set at the potentiometer 53.

And the capacitor 80 is charged at a time constant which is determined by the resistance at the resistors 78, 79, & 82 and that between the collector and emitter of the transistor 76; when it is charged up to a predetermined voltage, it makes the uni-junction transistor 83 conductive. The resistance value of this resistor 79 is set small.

An alternating current from the alternating source 50 in FIG. 9 (A) is made by the full wave rectifier 51 into a signal of wave form shown in FIG. 9 (B), then made into a signal of wave form shown in FIG. 9 (C) by the transistor 92 and the Schmidt trigger circuit 95, and is finally input as a synchronous signal to the base of the transistor 76.

The wave form of the emitter voltage of the uni-junction transistor 83 becomes therefore like that shown in FIG. 9 (D). In other words, when the synchronous signal in FIG. 9 (C) has made the transistor 76 completely conductive the charged potential of the capacitor 80 is instantaneously discharged by way of the diode 81, the transistor 76, the resistor 79 of small resistance. When the capacitor 80 is again charged up to the predetermined voltage the uni-junction transistor 83 is triggered.

Pulses, shown in FIG. 9 (E), produced by the conduction of the uni-junction transistor 83 is supplied to the gate of the silicon rectifying element 52 via the transformer 85. So the wave form of power supplied to the motor 13 is like that shown in FIG. 9 (F).

If a high voltage is input by means of the change-over switch 63 to the first operational amplifier 69 the resistance value between the collector and emitter of the transistor 76 becomes greater to make the charging speed of the capacitor 80 faster, and in turn, to advance the phase of the pulses input to the gate of the silicon rectifying element 52.

If the cutting resistance to the work (to be machined) becomes large, for example, and consequently the mechanical load to the motor 13 grows large, the number of rotation of the motor 13 decreases to lower the electromotive voltage. The voltage to be put to the positive input terminal of the second operational amplifier 89 is naturally lowered and the voltage to be put to the negative input terminal of the first operational amplifier 69 is similarly lowered. It raises the voltage output from the first operational amplifier 69 and advances the phase of the pulses input to the gate of the silicon rectifying element 52. In other words, when the motor speed is decreased by the increasing of the mechanical load the power supplied thereto is increased, and when the motor speed is increased, on the contrary, the power supplied to the motor 13 is decreased, so the motor 13 can be so regulated as to be operated at a predetermined rotating speed.

While the table 2 is given a cutting feed in such a manner, the work fixed on the table 2 may be machined by a cutting tool of the milling machine. When the table 2 arrives at the end position of the forward movement stroke the dog 2a abuts on the actuating member 22 to actuate the second switch 21, whose actuating finger is shifted from the a-contact side to the b-contact side.

The relay CR2 is consequently de-energized to release the self-retained circuit, with the result of releasing the normal open contacts $CR2A_1$ through $CR2A_4$. As a result, the solenoid SOL is de-energized to switch over or change the valve 4 to the situation shown in FIG. 1. The table 2 is returned in the reverse direction of the arrow M at a rapid feeding speed for being restored to the original position shown in FIG. 1.

Due to the release of the normal open contact $CR2A_4$ of the relay CR2, the relay CR4 is de-energized to release its normal open contacts $CR4A_1$ and $CR4A_2$, with the result of halting once of the motor 13. Then due to the consequential effectuating of the normal close contacts $CR4B_1$ and $CR4B_2$, a direct current, which has been produced by rectifying in full wave an alternating current from the alternating source 50 through a full wave rectifier 98, is input to the motor 13 for reversely rotating the same. The motor 13 is rotated at a constant speed (rapid retracting speed), and the rotational force (torque) thereof is to be transmitted, just similarly as the earlier statement, to the rack 7. The latter is moved in the backward (reverse) direction as far as the switch actuating member 19 fixed on the actuating rod 17 abuts on the actuating finger of the first switch 20.

Upon the switching over of the actuating finger of the first switch 20 from the a-contact side to the b-contact side causes a de-energization of the relays CR1, CR3, & CR4 for releasing its normal open contact $CR1A_1$, with the result of halting the motor 13. And a motor M1 is also halted by the release of the normal open contact $CR1A_2$.

A case wherein the table 2 is adjusted in its rapid feeding stroke will be described hereunder.

Referring to FIG. 7, releasing of the adjusting switch SB2 followed by depressing of the starting switch PB2 causes the changing over of the valve 4 similarly to the abovementioned mode for moving the table 2 in a rapid feeding speed. The tip of the piston rod 6 will consequently abut on the rack 7 to make the actuating finger of the first switch 20 shift from the b-contact side to the a-contact side.

Depressing again of the press button switch PB2 causes energization of the relays CR1, CR3, & CR4, by way of the a-contact of the first switch 20 and the press button switch PB2, for driving the motor 13, with the result of advancement of the table 2 and the rack 7. The switch actuating member 19 will project together with the actuating rod 17 beyond the forward end position of the frame 1.

Release then depressing of the press button switch PB2 at a position where the table 2 has been advanced by a predetermined distance, followed by a release of an adjusting screw 19a of the switch actuating member 19 for moving the switch actuating member 19 by a desired distance. Tighten the adjusting screw 19a at that position for fixing the switch actuating member 19 on the actuating rod 17.

Returning of the adjusting switch SB2 at this stage to the original position will cause the table 2 to advance just in an earlier stated mode. The table 2 is soon afterwards to be restored, in response to a signal from the second switch, to the original position shown in FIG. 1.

Figure 10:
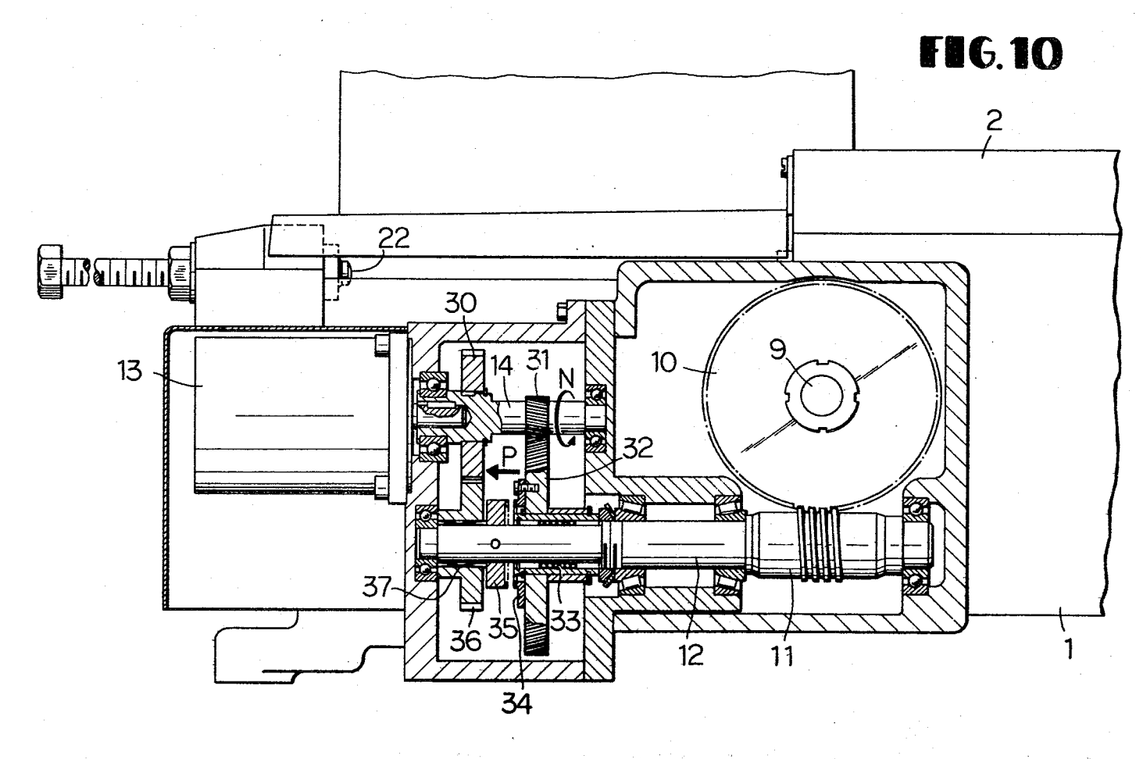
FIG. 10 is a projectional view of a second embodiment seen from a direction just corresponding to that in FIG. 3.

FIG. 10 illustrates a second embodiment concerning the part of the drive transmitting mechanism, i.e., the mechanism between the variable speed motor and the worm wheel. Regarding the part identical to that in the first embodiment, the description above-mentioned is applicable to this case as it is. In the drawing, numeral 30 designates a first spur gear secured to a motor shaft 14. 31 is a first helical gear secured to the motor shaft 14; 32 is a second helical gear which is axially carried by the rotary shaft 12, via a ballslide bearing 33, and engaged with the first helical gear 31; 34 is a first claw or dog clutch member secured to the second helical gear 32; 35 is a second claw clutch member secured to the rotary shaft 12; and 36 is a second spur gear carried by the rotary shaft 12, via a one-way clutch 37, and engaged with the first spur gear 30. The gear ratio between the first and second helical gears is 1:6, and that between the first and second spur gears is 1:1.

When the variable speed motor 13 is driven in the positive direction marked with the arrow N, the rotational force (torque) is transmitted to the motor shaft 14, the first helical gear 31, and the second helical gear 32 in the order.

Since the second helical gear 32 receives a force in the direction indicated with the arrow P, on account of its structure, to be shifted in the same direction, the first claw clutch member 34 is to be engaged with the second claw clutch member 35, whose rotational force is, via the second claw clutch member 35, the rotary shaft 12, the worm 11, the worm wheel 10, the pinion shaft 9, and the pinion 8, transmitted to the rack 7. The reciprocating speed of the rack 7 can be therefore regulated by the above-mentioned mechanism.

Although the second spur gear 36 is rotated because of its engagement with the first spur gear 30, the rotational force of the former is not transmitted to the rotary shaft 12 by the act of the one way clutch 37.

Besides, a reverse rotation of the motor 13 will rotate the first helical gear 31 in the reverse direction of N arrow for moving the second helical gear in the reverse direction of P arrow, with the result of separation of the first claw clutch member 43 from the second claw clutch member 35. It interrupts transmission of the rotational force of the first claw clutch 34 to the rotary shaft 12.

Parallelly to the above-mentioned movement, the reverse rotational force of the motor 13 is, via the first spur gear 30, the second spur gear 36, the one-way clutch 37, the rotary shaft 12, the worm 11, the worm wheel 10, the pinion shaft 9, and the pinion 8, transmitted to the rack 7 for restoring the same to the original position.

This embodiment is constructed such that a force in the direction of P arrow, generated due to the drive transmission between the helical gears, may be utilized in engaging and disengaging the claw clutch members 34, 35. So no special means is needed for shifting the second helical gear, which allows the construction of the clutch mechanism to be simple in construction and the engagement and disengagement to be ensured.

This invention relates to, as described above in greater detail, a movement controlling device, wherein a table is driven by a fluid pressure means and the feeding speed of the table is controlled by the rotational speed of a motor which is connected, to a rack to be engaged with the table at a desired position, whereby the table can be automatically imparted a rapid feeding movement, a subsequent movement of cutting feed, and a backward movement. This invention is provided with several merits such as assured starting of the cutting feed at a predetermined position of initiating the cutting feed, simple construction, low cost of manufacturing, etc.

What is claimed is:

1. A device for controlling the movement of a movable member on a frame comprising:
   a fluid pressure means associated with the movable member for reciprocating the member in forward and backward directions;
   a rack movably mounted on the frame so as to be engaged with the movable member at a predetermined position during the movement of the member in the forward direction and to be movable with the member after the engagement with the rack;
   a variable speed and reversible motor operatively connected with the rack through an intermediate mechanism;
   the intermediate mechanism including elements which transmit the force from the motor to the rack and interrupt the transmission of the force from the rack to the motor;
   a first means for generating a signal when the movable member arrives at the predetermined position during the movement of the member in the forward direction;
   a first driving circuit responsive to the signal from the first generating means for driving the motor in a predetermined direction in order to move the rack in the forward direction at a predetermined speed;
   a second means for generating a signal when the movable member arrives at the end position in the forward direction;
   means reponsive to the signal from the second generating means for changing the operating direction of the fluid pressure means in order to move the movable member in the backward direction;
   a second driving circuit responsive to the signal from the second generating means for reversing the motor in order to return the rack; and
   a third means for generating a signal to make the second driving circuit de-effective when the rack returns to the predetermined position.

2. A device for controlling the movement of a movable member on a frame according to claim 1, wherein the elements of the intermediate mechanism consists in:
   a worm operatively connected with the motor; and
   a worm-wheel operatively connected with the rack and geared with the worm.

3. A device for controlling the movement of a movable member on a frame according to claim 1, wherein the first signal generating means comprises:
   an actuating rod on the rack adapted to be movable in the same direction as the movement of the rack;
   means for normally holding the actuating rod to the rack in such a manner that one end of the actuating rod slightly projects beyond one end of the rack, so that the movable member is engaged with the end of the actuating rod prior to the engagement with the rack during the movement of the movable member in the forward direction; and
   a switch disposed to be operated by the actuating rod when the actuating rod is engaged with the movable member and is slightly moved against the action of the holding means, and generating a signal to make the first driving circuit effective.

4. A device for controlling the movement of a movable member on a frame comprising:
   a fluid pressure means associated with the movable member for reciprocating the member in forward and backward directions;
   a rack movably mounted on the frame so as to be engaged with the movable member at a predetermined position during the movement of the member in the forward direction and to be movable with the member after the engagement with the member;
   a variable speed and reversible motor operatively connected with the rack through intermediate mechanism;
   the intermediate mechanism including a worm operatively connected with the motor, and a worm-wheel operatively connected with the rack and geared with the worm;
   a rod on the rack adapted to be movable in the same direction as the movement of the rack;
   means for normally holding the rod to the rack in such a manner that one end of the rod slightly projects beyond one end of the rack, so that the movable member is engaged with the end of the rod prior to the engagement with the rack during the movement of the movable member in the forward direction;
   an actuating member fixed to the rod;
   a first switch disposed to be operated by the actuating member for generating a signal when the rod is engaged with the movable member and is slightly moved against the action of the holding means;
   a first driving circuit responsive to the signal from the first switch for driving the motor in a predetermined direction in order to move the rack in the forward direction at a predetermined speed;
   a second switch disposed to be operated by the movable member for generating a signal when the member arrives at the end position in the forward direction;
   means responsive to the signal from the second switch for changing the operating direction of the fluid pressure means in order to move the movable member in the backward direction;
   a second driving circuit responsive to the signal from the second switch for reversing the motor in order to return the rack; and
   the first switch being adapted to generate a signal to make the driving circuit de-effective when the rack is returned to the predetermined position and the first switch is operated by the actuating member returned.

5. A device for controlling the movement of a movable member on a frame according to claim 1 wherein the actuating member adjustably fixed to the rod for changing the returning position of the end of the rod, whereby a rapid speed stroke of the movable member in the forward direction is made variable.

* * * * *